UNITED STATES PATENT OFFICE 2,290,906

MANUFACTURE OF COLORING MATTERS OF THE PHTHALOCYANINE SERIES

Samuel Coffey, Norman Hulton Haddock and James Robert Francis Jackson, Blackley, Manchester, England, assignors to Imperial Chemical Industries Limited, a corporation of Great Britain No Drawing. Application February 12, 1940, Serial No. 318,646. In Great Britain February 20, 1939

12 Claims. (Cl. 260—314)

The invention relates to the manufacture of new coloring matters of the phthalocyanine series.

An object of the present invention is to provide valuable new coloring matters. Another object of the invention is to provide new water-soluble dyestuffs. A further object is to provide new chemical compounds which are alkyl-thio phthalocyanines and aralkyl-thio phthalocyanines. A still further object is to provide new chemical compounds which are sulphonium derivatives of the said alkyl-thio phthalocyanines and of aralkyl-thio phthalocyanines. Other objects will appear hereinafter.

We have found that valuable coloring matters of the phthalocyanine series are obtained by converting alkyl- or aralkyl-thio phthalocyanines into water-soluble sulphonium derivatives by treating them with alkyl sulphates or sulphites. The so-obtained sulphonium derivatives are new compounds and may be expressed by the general formula:

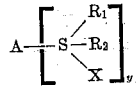

wherein A designates the radical of a phthalocyanine compound formed by removing from its arylene nuclei $y$ hydrogen atoms; $y$ stands for an integer not greater than 4; $R_1$ stands for a member of the group consisting of alkyl and aralkyl radicals; $R_2$ designates a lower alkyl radical; and X designates an anionic radical of the group consisting of the lower mono-alkyl sulfates and the lower monoalkyl sulfites. They are eminently useful as direct dyestuffs for cotton and viscose artificial silk, possessing good affinity for the fibre, and giving green to bluish-green dyeings of high fastness to washing.

The above-mentioned alkyl- or aralkyl-thio phthalocyanines which are used as initial materials for this invention, are in part new compounds and may carry other substituents besides the thio radical, e. g, pyridyl. They may therefore be expressed by the general formula

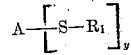

wherein A, $R_1$ and $y$ have the same significance as above. They can be made, we have found, by heating an alkyl- or aralkyl-thio phthalic acid or phthalic anhydride with a metal salt in the presence of urea. Preferably there are also present compounds of elements of the fifth group such as molybdates, vanadates and phosphates and if desired boric acid.

The said starting materials can also be applied in admixture with other aromatic compounds containing two carboxylic acid groups in o-position to each other and capable of forming phthalocyanines, the dyestuffs thus formed containing in the same molecule the radicles of the various starting materials employed.

Alternatively, in respect of making copper phthalocyanines, alkyl- or aralkyl-thio-1:2-dihalogenobenzenes are heated with cuprous cyanide in presence of organic nitrogen bases, e. g. quinoline.

In the above manner there may be made, for example, for the purpose of carrying out the present invention, the following phthalocyanines, which are subsequently converted, according to the invention, into sulphonium derivatives, by means of causing them to interact with alkyl sulphates or sulphites as hereinbelow defined:

Copper tetra (4) methylthio phthalocyanine
Copper tri (4) methylthio phthalocyanine
Copper tetra (4) benzylthio phthalocyanine
Copper tetra (3) methylthio phthalocyanine
Copper tetra (4) dodecylthio phthalocyanine
Copper tetra (4) methylthio phthalocyanine
Cobalt tetra (4) methylthio phthalocyanine
Magnesum tetra (4) methylthio phthalocyanine
Copper di (4) methylthio-di (4) pyridylphthalocyanine In order to convert the alkyl- or aralkyl-thio phthalocyanines to the sulphonium derivatives, there are employed in accordance with the invention lower alkyl sulphates or sulphites. Thus there may be used in making the sulphonium derivatives: dimethyl sulphate, dimethyl sulphite, or diethyl sulphate, for example.

By the employment of the phthalocyanine sulphonium derivatives of the present invention in applying them to cotton or other cellulosic material as direct dyestuffs therefor, there may be produced dyeings in green shades of outstanding brightness and very good fastness to washing treatment, e. g., soap boiling or open soda boiling. Moreover it has been found that by treating the resulting dyeings with aqueous sodium hydrochlorite solution (½°Tw.) or other suitable oxidising agent, they are thereby converted from green to blue shades. By proceeding in this way there may be obtained blue shades of excellent fastness both to light and to washing.

As already indicated it is contemplated within the scope of the invention to convert to their sulphonium compounds not only phthalocyanines containing four thio substituents but also phthalocyanines containing less than four thio substituents, for instance, three or two such substituents. Accordingly there may be obtained in this way water-soluble sulphonium derivatives of phathalocyanines, which contain two, three or four sulphonium groups, or even only one sulphonium group, as exemplified by copper mono (4) methylthio phthalocyanine methosulphate, that is the compound of the formula

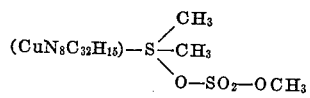

(wherein $CuN_8C_{32}H_{15}$ represents the monovalent radical of copper phthalocyanine and wherein the sulfonium radical is attached to the 4-position of one of the arylene nuclei) and which may also be named cupro-phthalocyanino (4)-dimethyl-sulfonium-methylsulfate. However that embodiment of the invention in accordance with which sulphonium derivatives of phthalocyanines having more than one sulphonium group, are made, is preferred as being more advantageous, because it has been found that the affinity of the present new phthalocyanine sulphonium compounds for cellulosic fibre tends to diminish somewhat as the number of sulphonium groups is decreased, and more markedly when the number of such groups falls below two.

The invention is illustrated but not limited by the following examples in which the parts are by weight.

*Example 1*

1 part of copper tetra (4) methylthio phthalocyanine, prepared as described below, and 4 parts of dimethyl sulphate are heated together at 180° C. for 2½ hours. The product when cold is ground with carbon tetrachloride to remove the excess of dimethyl sulphate, boiled with alcohol and then filtered. The residue is dried at 70° C. It is a dark blue powder with a bronzy lustre which is readily soluble in water. It probably corresponds to the formula

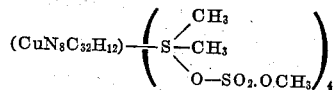

and may be named cuprophthalocyanino-octamethyl-tetra - sulfonium - tetra(methylsulfate). It dyes cotton bluish-green shades from neutral or alkaline baths which possess excellent fastness properties particularly to washing, and are converted by heating with dilute aqueous sodium hypochlorite solution into blue shades of excellent light fastness.

The copper tetra (4) methylthio phthalocyanine employed above may be made by boiling under reflux at 200° C. for 3 hours, 2 parts of 3:4-dibromo-1-methylthio benzene (prepared by coupling diazotised 3:4-dibromaniline with potassium ethyl-xanthate, hydrolysing the resulting xanthic ester and methylating the dibromothiobenzene so-obtained with dimethyl sulphate), 1.5 parts of cuprous cyanide, 2.5 parts of pyridine and 30 parts of nitrobenzene. When cold, the green coloring matter is filtered off and dried.

Copper tetra (4) methylthio phthalocyanine may also be made by heating together 5 parts of 4-methylthio phthalic acid (prepared by methylation of 4-thiophthalic acid,

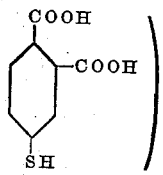

and 12 parts of urea to 150° C. and adding 1.5 parts of cuprous chloride and 0.1 part of ammonium molybdate. The temperature is then raised slowly to 200–210° and heating continued for 3 hours. The melt which is green in color, is cooled, powdered and purified by successive extractions with boiling dilute sodium hydroxide and boiling dilute sulphuric or hydrochloric acid. The product is a green powder which dissolves in boiling chloronaphthalene to give a green solution.

Copper tetra (4) methylthio phthalocyanine may be purified by dissolving in 98% sulphuric acid and pouring the solution into cold water. It then has the appearance of a bright green powder.

*Example 2*

1 part of the phthalocyanine prepared as described at the end of Example 1, and 5 parts of diethyl sulphate are heated together at 170° C. for ½ an hour. The reaction product is cooled and ground with carbon tetrachloride to remove the excess of diethyl sulphate. The residue is dried at 70° C. It is a hygroscopic violet mass with a bronzy lustre, which is readily soluble in water. It probably corresponds to the formula

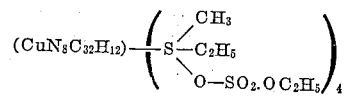

and may be named cuprophthalocyaninotetra(methyl-ethyl-sulfonium-methylsufate). It dyes cotton directly from neutral or alkaline baths. The resulting green shades possess excellent fastness properties, particularly to washing. By aftertreating the dyed cotton with 1% aqueous sodium hypochlorite solution bright blue shades are obtained of excellent fastness to washing and light.

*Example 3*

Copper tetra (3) methylthio phthalocyanine methosulphate (wherein "methosulfate" is a conventional abbreviation for the phrase "methylmethylsulfate addition product"; hence, this compound may also be named cuprophthalocyanino(3)-octamethyl - tetrasulfonium - tetramethylsulfate) is made by heating 3 parts of copper tetra (3) methylthio phthalocyanine (made as described below) with 20 parts of dimethyl sulphate for 2 hours at 170° C. The product is isolated by treatment with carbon tetrachloride and alcohol in accordance with Example 1 and forms a bright blue hygroscopic powder. It dyes cotton in green shades, converted to bright blue shades on treatment with dilute aqueous sodium hypochlorite solution.

Copper tetra (3) methylthio phthalocyanine is made in the manner described at the end of Example 1 but using in place of 5 parts of 4-methylthio phthalic acid there employed, 4.8 parts of 3-methylthio phthalic anhydride (made by interacting diazotised 3-aminophthalic acid with potassium ethyl xanthate, hydrolysing the resulting xanthic ester, methylating the thiophthalic acid thus obtained

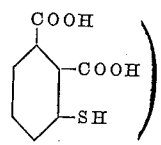

with dimethyl sulphate and converting to the corresponding anhydride by treatment with acetic anhydride) and forms a dull green powder.

Example 4

Nickel tetra (4) methylthio phthalocyanine methosulphate (which may be otherwise designated as nickelophthalocyanino-(4)-octamethyl-tetrasulfonium-tetramethylsulfate) is made by heating 4 parts of nickel tetra (4) methylthio phthalocyanine (made as described below) with 24 parts of dimethyl sulphate for 1 hour at 150–160° C. The product is separated from the reaction mixture in the way described in Example 1 and forms a greenish blue mass. It dissolves in water and the solution when dyed on cotton affords a bright bluish green shade, turning to a bright blue of excellent fastness properties on treatment with aqueous sodium hypochlorite solution.

The methosulphate (i. e. the methyl-methylsulfate addition product) of cobalt tetra (4) methylthio phthalocyanine (prepared as described below) may be made in like manner.

Nickel tetra (4) methylthio phthalocyanine is made by the process described at the end of Example 1 but employing 1 part of anhydrous nickelous chloride in place of 1.5 parts of cuprous chloride, and forms a bright green powder. Cobalt tetra (4) methylthio phthalocyanine is obtained in similar manner as a dark green powder, by using an equal weight of anhydrous cobaltous chloride instead of the nickelous chloride.

Example 5

4 parts of copper tetra (4) benzylthio phthalocyanine, made as described below, are heated with 26 parts of dimethyl sulphate for 1½ hours at 150–160° C. and the sulphonium derivative is isolated by the method of Example 1. The product may be designated as cuprophthalocyanino-(4)-tetra(benzyl-methyl-sulfonium-methylsulfate). It forms a deep blue powder dissolving in water to a deep blue solution by which cotton is dyed a bright green shade which is converted to a bright blue on treatment with sodium hypochlorite solution.

Copper tetra (4) benzylthio phthalocyanine is made by heating 13 parts of 4-benzylthio phthalic anhydride

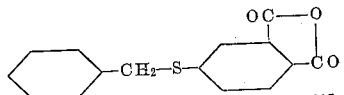

prepared by reacting benzyl chloride with 4-thiophthalic acid in alcoholic sodium hydroxide solution and treating the product with acetic anhydride, 42 parts of urea, 4.2 parts of cuprous chloride, 0.2 part of ammonium molybdate and 0.2 part of boric acid to 180° C. for 1½ hours. The temperature is then raised to 185° C. and maintained thereat for 2 hours. After isolating as described at the end of Example 1, copper tetra (4) benzylthio phthalocyanine is obtained as a green powder which dissolves in hot pyridine to give a green solution.

Example 6

5 parts of copper tri (4) methylthio phthalocyanine (prepared as described below) are treated with 26 parts of dimethyl sulphate at 160° C. for 2 hours. The product is separated according to the method of Example 1 and may be designated as cuprophthalocyanino-(4)-hexamethyl - trisulfonium - tri(methylsulfate). It forms a bright blue powder which dyes cotton and other cellulosic materials in bright green shades, converted by the action of dilute sodium hypochlorite solution to bright blue shades of excellent fastness properties.

The methosulphate of copper di (4) methylthio phthalocyanine (in other words, cuprophthalocyanino-(4)-tetramethyl-disulfonium - di(methylsulfate); prepared as described below), made in a similar way from the corresponding phthalocyanine, forms a violet powder with a metallic lustre. It also gives green shades on cotton turning to blue on treatment with oxidising agents.

Copper tri (4) methylthio phthalocyanine is made by heating a mixture of 20 parts of 4-methylthiol phthalic anhydride (prepared from the corresponding acid with acetic anhydride), 5 parts of phthalic anhydride, 80 parts of urea, 7 parts of cuprous chloride, 0.5 part of ammonium molybdate and 0.5 part of boric acid in 120 parts of α-chloronaphthalene to 180° C. for 45 minutes. The product, when isolated as described at the end of Example 1, is a green powder. It dissolves in hot xylene to give a green solution.

Similarly by using instead of 20 parts of 4-methylthio phthalic anhydride and 5 parts of phthalic anhydride, 13.5 parts of 4-methylthio phthalic anhydride and 10 parts of phthalic anhydride, copper di (4) methylthio phthalocyanine is obtained as a bluish-green powder.

Example 7

0.5 part of copper tri (4) methylthio phthalocyanine (made as described in Example 6) and 2 parts of dimethyl sulphite are heated in a closed vessel at 220–230° C. for 2 hours. The pasty mass so obtained in washed with ether and alcohol and dried at 50° C. In this way there is produced a hygroscopic blue-black powder, dissolving in water to give a deep bluish-green solution, which dyes cotton bright green. The shades so-obtained turn to bright blue shades of good fastness properties on treatment with dilute aqueous sodium hypochlorite solution. The product of this example may be named cuprophthalocyanino - (4) - hexamethyl- trisulfonium-tri(methylsulfite), and may be represented by the formula

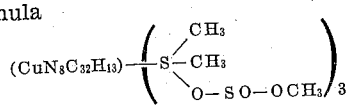

Example 8

4 parts of copper di (4) methylthio-di (4) pyridyl phthalocyanine (prepared as described below) are reacted with 26 parts of dimethyl sulphate at 160° C. for 2 hours. The product separated as described in Example 1 corresponds most probably to the formula

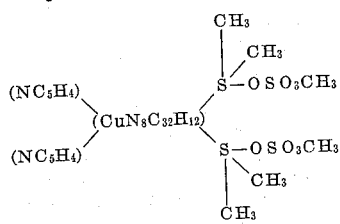

and forms a dark blue powder, which dyes cotton in bluish green shades, which on treatment with dilute aqueous sodium hypochlorite afford greenish blue shades of excellent fastness properties.

Copper di (4) methylthio-di (4) pyridyl phthalocyanine is made by heating a mixture of 14.5 parts of 4-methylthio phthalic anhydride, 16.8 parts of 4-pyridylphthalimide, 90 parts of urea, 7.5 parts of cuprous chloride and 0.6 part of ammonium molybdate in 150 parts of α-chloronaphthalene for 30 minutes at 180° C. The melt is then heated at 190° C. for 2½ hours. The product, isolated as described at the end of Example 1, forms a bright green powder.

*Example 9*

4.6 parts of metal-free tetra (4) methylthio phthalocyanine made as described below are converted to the methosulphate by treatment with 30 parts of dimethyl sulphate at 160° C. for 2 hours. The product, separated as described in Example 1, is a bright blue powder, and dyes cotton in yellowish green shades.

Metal-free tetra (4) methylthio phthalocyanine is prepared from magnesium tetra (4) methylthio phthalocyanine (see below) by dissolving it in 98% sulphuric acid and pouring the solution into water.

Magnesium tetra (4) methylthio phthalocyanine is made by heating 15 parts of 4-methylthio-mercapto-phthalic anhydride, 22.5 parts of urea, 5.25 parts of anhydrous magnesium chloride, 0.75 parts of ammonium molybdate and 60 parts of α-chloronaphthalene at 150° C. for 30 minutes. The temperature is then gradually raised to 200° C. and maintained thereat for 4 hours. The phthalocyanine is isolated as described at the end of Example 1 as a bright green powder.

*Example 10*

1 part of copper tetra (4) ethylthio phthalocyanine (made as described below) is heated with 5 parts of dimethyl sulphate at 150–160° C. for 30 minutes. The product of the reaction separated as described in Example 1 forms a blue hygroscopic mass. It dyes cotton in green shades which on treatment with dilute sodium hypochlorite solution afford blue shades of excellent fastness properties.

Copper tetra (4) ethylthio phthalocyanine is made by slowly heating 3 parts of 4-ethylthio phthalic anhydride (prepared by reacting 4-thiophthalic acid with diethyl sulphate in the presence of sodium hydroxide and treating the product with acetic anhydride), 9 parts of urea, 0.8 part of cuprous chloride, 0.1 part of ammonium molybdate, 0.1 of boric acid and 15 parts of α-chloronaphthalene to 215° C. The temperature is then kept at 215–220° C. for 2 hours. After isolating in the manner described at the end of Example 1, the copper tetra (4-ethylthio) phthalocyanine is obtained as a bright green powder.

As many apparently widely different embodiments of this invention may be made without departing from the spirit and scope thereof, it is to be understood that we do not limit ourselves to the specific embodiments thereof except as defined in the appended claims.

We claim:

1. Process for the manufacture of new water-soluble sulphonium derivatives of phthalocyanines comprising interacting a member of the group consisting of alkyl-thiophthalocyanines and aralkyl-thiophthalocyanines with an alkylating agent selected from the group consisting of lower dialkyl sulfates and lower dialkyl sulfites.

2. A process for the manufacture of water-soluble compounds of the phthalocyanine series, which comprises reacting a phthalocyanine pigment in which at least one of the nuclear hydrogens is replaced by a thioether group with an alkylating agent adapted to convert a thioether group into a sulfonium radical.

3. A process for the manufacture of water-soluble phthalocyanine compounds adapted for use as dyestuffs for cellulosic fiber, which comprises reacting a tetra-alkylthio-phthalocyanine with an alkylating agent selected from the group consisting of lower dialkylsulfates and lower dialkyl sulfites.

4. A coloring matter of the phthalocyanine series being characterized by having at least one sulfonium group attached directly to one of the arylene rings within the molecule, and being further characterized by solubility in water, and by its capacity for dyeing cotton from aqueous bath in green shades, which upon mild oxidation with aqueous hypochlorite solution are converted into green to blue shades.

5. A tetrasulfonium salt of a metal phthalocyanine, the sulfonium radicals being attached directly to the arylene nuclei of the phthalocyanine molecule.

6. A compound of the general formula

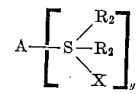

wherein A designates the radical of a phthalocyanine compound lacking $y$ nuclear hydrogen atoms, $y$ being an integer from 1 to 4; $R_1$ stands for a member of the group consisting of alkyl and aralkyl radicals; $R_2$ stands for a lower alkyl radical; and X stands for an anionic radical of the group consisting of the lower monoalkyl sulfates and the lower monoalkyl sulfites.

7. A phthalocyanine compound of the general formula

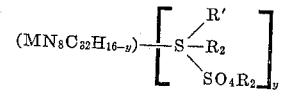

wherein M stands for a member of the group consisting of bivalent metals and a pair of hydrogen atoms, $y$ is an integer from 1 to 4; $R_1$ is a radical of the group consisting of alkyl and aralkyl; and $R_2$ is a lower alkyl radical.

8. A phthalocyanine compound of the general formula

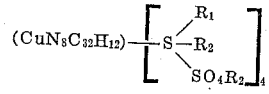

wherein $R_1$ is a radical of the group consisting of alkyl and aralkyl; and $R_2$ is a lower alkyl radical.

9. Cuprophthalocyanino - octaalkyl - tetrasulfonium tetra-alkylsulfate, the same being a compound substantially identical with the compound obtained by reacting a tetra-(alkyl-thio)-copper-phthalocyanine with a dialkyl sulfate.

10. Cuprophthalocyanino - tetra(methyl-ethylsulfonium-ethyl sulfate), being substantially identical with the compound obtainable by reacting with diethyl sulfate upon tetra-(methyl-thio)-copper-phthalocyanine.

11. Cuprophthalocyanino-octamethyl-tetrasulfonium-tetramethylsulfate, being the compound obtainable by reacting with dimethyl sulfate upon tetra-(methyl-thio)-copper-phthalocyanine.

12. Cuprophthalocyanino - hexamethyl - trisulfonium-trimethylsulfate, being the compound obtainable by reacting with dimethyl sulfate upon tri-(methyl-thio)-copper-phthalocyanine.

SAMUEL COFFEY.
NORMAN HULTON HADDOCK.
JAMES ROBERT FRANCIS JACKSON.